(12) United States Patent
Kopp et al.

(10) Patent No.: US 6,371,693 B1
(45) Date of Patent: *Apr. 16, 2002

(54) MAKING SUBSEA PIPELINES READY FOR ELECTRICAL HEATING

(75) Inventors: Frans F. Kopp; Ronald M. Bass, both of Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/679,087

(22) Filed: Oct. 4, 2000

Related U.S. Application Data

(63) Continuation-in-part of application No. 08/921,737, filed on Aug. 27, 1999, now Pat. No. 6,142,707.

(51) Int. Cl.[7] .......................... F16L 53/00; F16L 59/16; E21B 43/24
(52) U.S. Cl. .......................... 405/158; 166/302; 138/33; 392/321; 392/469; 137/341; 285/41
(58) Field of Search .......................... 405/158; 166/302; 285/41; 138/32, 33; 137/334, 341; 392/304, 320, 321, 469

(56) References Cited

U.S. PATENT DOCUMENTS

| | | | |
|---|---|---|---|
| 2,178,720 A | * 11/1939 | Daniels | 219/630 |
| 3,515,837 A | * 6/1970 | Ando | 219/618 |
| 6,049,657 A | 4/2000 | Sumner | 392/469 |
| 6,278,095 B1 | * 8/2001 | Bass et al. | 219/629 |
| 6,278,096 B1 | * 8/2001 | Bass | 219/629 |

OTHER PUBLICATIONS

"Direct Impedance Heating of Deepwater Flowlines," OTC 11037, May, 1999.

A New Method for Heat Tracing Long Pipelines, ASME 74–Pet–35, 1974.

* cited by examiner

*Primary Examiner*—Thomas B. Will
*Assistant Examiner*—Tara L. Mayo

(57) ABSTRACT

Apparatus and method are provided for connecting electrical power for heating subsea pipelines after the pipeline is deployed. Electrical connections may be made subsea using wet-mateable connectors. The electrical power may be supplied from a boat or may be supplied from a host structure. A Remotely Operated Vehicle may be used to make the subsea electrical connections. Single Heated Insulated Pipes, Pipe-in-Pipe, heat tracing and other configurations for heating may be employed. The deployment of cables and other equipment for heating may be delayed until a need or potential need for heating or the probable locations of impediments to flow are identified in the subsea pipeline.

43 Claims, 7 Drawing Sheets

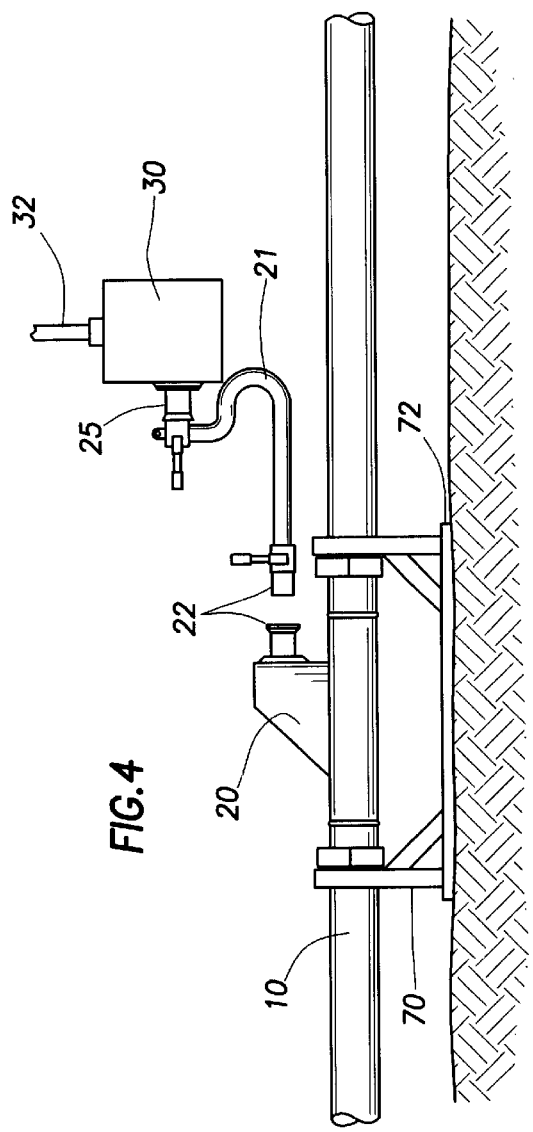
FIG.4
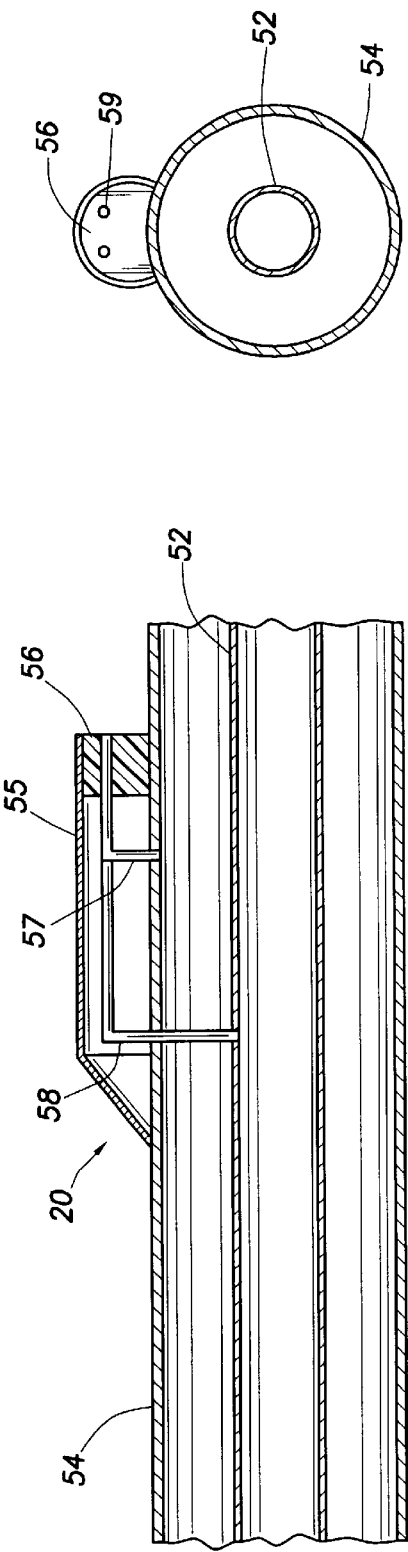
FIG.5b
FIG.5a

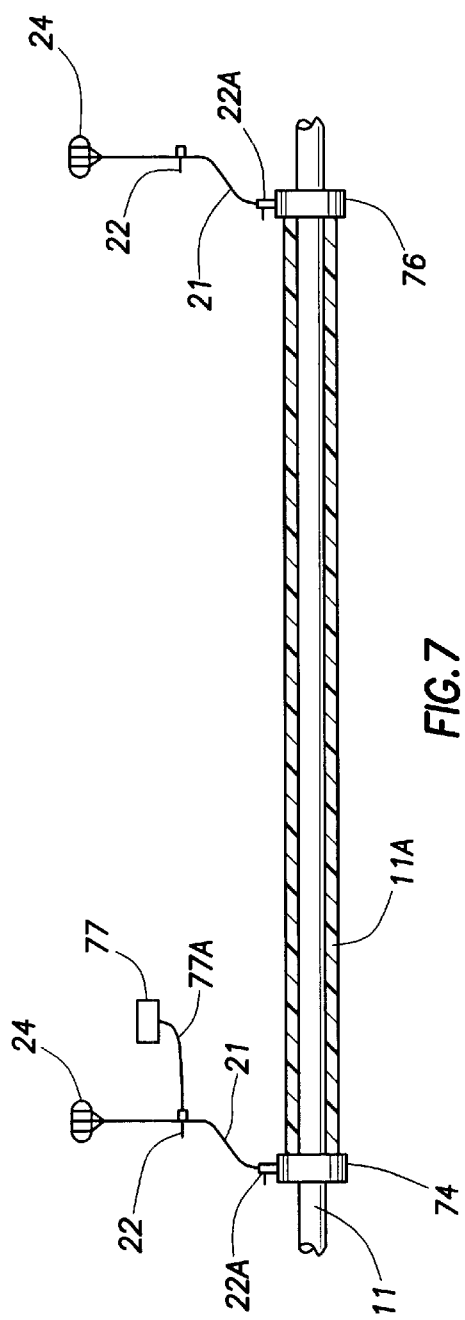
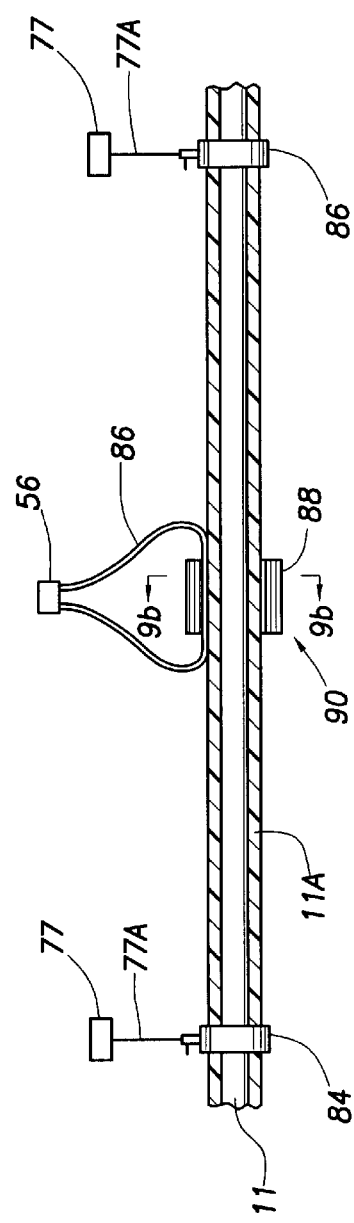
FIG.7
FIG.9a

MAKING SUBSEA PIPELINES READY FOR ELECTRICAL HEATING

This application is a continuation in part of Ser. No. 08/921,737, filed Aug. 27, 1999, now U.S. Pat. No. 6,142,707.

BACKGROUND OF THE INVENTION

1. Field of the Invention

The present invention relates to electrical heating of subsea pipelines. More particularly the invention relates to making subsea pipelines ready for electrical heating, such that electrical power can be applied to a selected segment of a pipeline after deployment and when heating is needed.

2. Description of Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep and where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable. Hydrocarbon gas under pressure combines with water at reduced temperatures to form a solid material, called a "hydrate." Hydrates can plug pipelines and the plugs are very difficult to remove. In deep water, conventional methods of depressurizing the flow line to remove a hydrate plug may not be effective. Higher pressures in the line and uneven sea floor topography require excessive time and may create more operational problems and be costly in terms of lost production.

The problem of lower temperatures in subsea pipelines has been addressed by placing thermal insulation on the lines, but the length of some pipelines makes thermal insulation alone ineffective. Increased flow rate through the lines also helps to minimize temperature loss of the fluids, but flow rate varies and is limited by other factors. Problems of heat loss from a pipeline increase late in the life of a hydrocarbon reservoir because production rates often decline at that time. Problems become particularly acute when a pipeline must be shut-in for an extended period of time. This may occur, for example, because of work on the wells or on facilities receiving fluids from the pipeline. The cost of thermal insulation alone to prevent excessive cooling of the lines becomes prohibitive under these conditions.

Heating of pipelines by bundling the lines with a separate pipeline that can be heated by circulation of hot fluids has been long practiced in the industry. Also, heating by a variety of electrical methods has been known. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999.) Previously developed apparatus included "Combipipe," which employs electrical conductors in the insulation layer of a pipe, ("Heating of Pipelines, and Power Supply to Subsea Electrical Equipment," DOT, 1995) and heat tracing, which employs a conductor inside a heat tube in the vicinity of the pipeline ("A New Method for Heat Tracing Long Pipelines," ASME 74-Pet-35, 1974).

Two configurations for electrical heating have been particularly considered in recent years. In one configuration, a single flowline is electrically insulated and current flows along the flowline. This is called the "SHIP" system (Single Heated Insulated Pipe). Two SHIP systems have been considered: the fully insulated system, requiring complete electrical insulation of the flowline from the seawater, and the earthed-current system, requiring electrical connection with the seawater through anodes or other means. For both systems, current is passed through the flowline pipe. A fully insulated method of electrically heating a pipeline is disclosed in U.S. Pat. No. 6,049,657. In this method, an electrically insulated coating covers a single pipeline carrying fluids from a well. An alternating current is fed to one end of the pipeline through a first insulating joint near the source of electrical current and the current is grounded to seawater at the opposite end of the pipe through a second insulating joint.

In a second configuration for electrical heating, a pipe-in-pipe subsea pipeline is provided by which a flow line for transporting well fluids is the inner pipe and it is surrounded concentrically by and electrically insulated from an electrically conductive outer pipe until the two pipes are electrically connected at one end. Voltage may be applied between the inner and outer pipes at the opposite end and electrical current flows along the exterior surface of the inner pipe and along the interior surface of the outer pipe. This pipe-in-pipe method of heating is disclosed, for example, in Ser. No. 08/921,737, filed Aug. 11, 1999, which is commonly assigned and hereby incorporated by reference herein. A center-fed pipe-in-pipe configuration is disclosed in the commonly assigned application titled "Electrical Heating of Pipelines with Pipe-in-Pipe and Mid-Line Connector," filed concurrently herewith and hereby incorporated by reference herein.

In all the configurations for electrical heating, it will often not be necessary to supply power to the pipeline continuously. In fact, heating may not be needed until years after a pipeline is deployed. For example, heating may only be needed with the production rate from an oil or gas field has declined, such that the fluids cool more in moving through a pipeline. A temporary interruption in flow through a pipeline may cause the need for heating, but after a plug has been removed there will be no need for heating. Also, only segments of the pipeline may require heating at any time—where plugging has occurred or where it is considered more likely. Installation of electrical cables or other facilities for heating a subsea pipeline requires significant capital expenditures. It will be advantageous to delay as many of these expenditures as long as possible. Therefore, there is a need to install subsea pipelines that can be heated only when the heating is required for optimum operation of the pipeline system. Such pipelines will be referred to as "electrically ready."

SUMMARY OF THE INVENTION

Toward providing these and other advantages, apparatus and method are provided for enhancing the flow of fluids through a subsea pipeline by heating a segment of the pipeline using portable or fixed electrical power generation equipment that is connected after the pipeline is deployed to the seafloor. The apparatus and method may be applied to the pipe-in-pipe configuration, the Single Heated Insulated Pipe (SHIP) configuration or any other configurations. The power generation equipment may be a conventional electrical generator mounted on a ship or a fixed structure. Preferably, alternating current is used, but direct current may also be used. Multiple segments of the pipeline may be heated, either contiguous segments or discontinuous segments, or the entire pipeline may be considered a segment.

In one embodiment, a mid-line electrical connector is installed with the pipe-in-pipe configuration and a wet-mateable connector is attached to the mid-line connector. The wet-mateable connector may be attached directly to the mid-line connector or it may be attached through a cable. The cable may be buoyed so that is more easily accessed by a Remotely Operated Vehicle (ROV). An ROV may be used at a later time to connect electrical power to the mid-line connector.

In another embodiment a wet-mateable connector is connected to one or more of the electrical connectors used to pass current through a segment of a Single Heated Insulated Pipe. The wet-mateable connector may be attached directly to one or more of the connectors or it may be attached through a cable. The cable may be buoyed and connected to electrical power at a later time. There may be a midline connector in the segment to be heated and it likewise may be accessible through a wet-mateable connector. The mid-line connector may be formed on the seafloor from a connector penetrating the insulation coating on the pipeline.

An electrically ready heated pipe is heated by connecting a source of power to the electrical conductors used in heating after the pipeline is deployed on the seafloor. For any configuration, the source of power may be lowered to the vicinity of a wet-mateable connector and connected, which may employ an ROV. To minimize power loss in an umbilical used to supply electrical power, the voltage may be stepped up at the source of power and stepped back down in the vicinity of the connector to the pipeline. The power factor of the power supplied may be improved to increase efficiency of heating.

In another embodiment a toroidal transformer is used to apply power. In another embodiment sea water electrodes are used to complete an electrical circuit through a segment of pipeline to be heated. In yet another embodiment, power is supplied to a riser along with a segment of the pipeline on the sea floor. Multiple segments may be heated simultaneously or in sequence. Selection of segments to be heated at any time may be made from measurements of pressure or other physical variables indicating where heating is needed.

In yet another embodiment, a toroidal transformer is used to extract power from a selected location along the segment being heated. A wet-mateable connector may be used to connect with the wire of the toroidal transformer. The power extracted may be used to operate a device, heat another short segment of pipeline or for other purposes.

DESCRIPTION OF THE DRAWINGS

For a more complete understanding of the invention and the advantages thereof, reference is now made to the following description taken in conjunction with the following drawings in which like reference numbers indicate like features and wherein:

FIG. 4 is a cross-section view of a midline connector with a wet-mateable connector with a pipe frame.

FIGS. 5(a) and 5(b) are cross-section and end views of a midline connector for a pipe-in-pipe configuration.

FIG. 7 is a cross-section view of a Single Heated Insulated Pipe deployed with a buoyed seawater electrode and a wet-mateable buoyed connector.

FIGS. 9(a) and 9(b) are cross-section and end views of a Single Heated Insulated Pipe with a mid-line toroidal transformer deployed with seawater electrodes at ends of the heated segment.

DETAILED DESCRIPTION

Figure 1A:
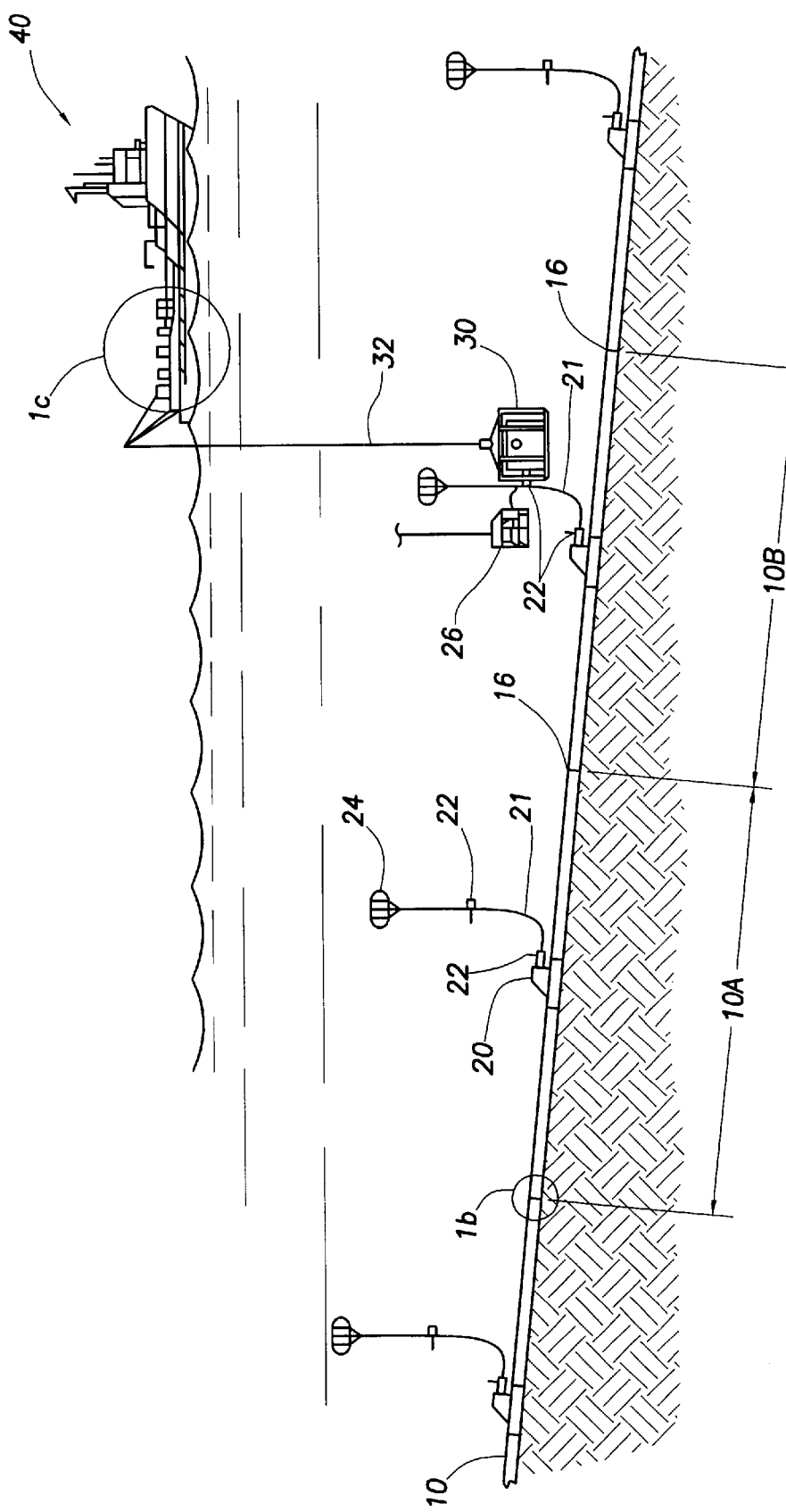
FIG. 1(a) is a conceptual layout of an electrical readiness system for heating of a subsea pipeline having a pipe-in-pipe configuration.
Figure 1C:
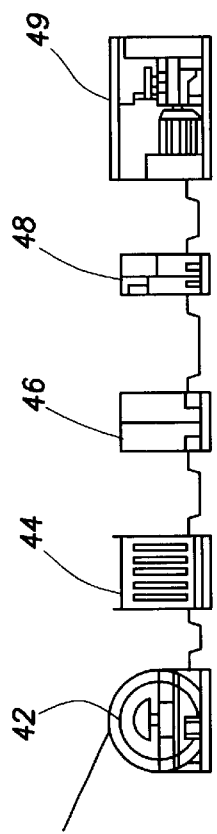
FIG. 1(c) is a detailed view of portable electrical power equipment.
Figure 1B:
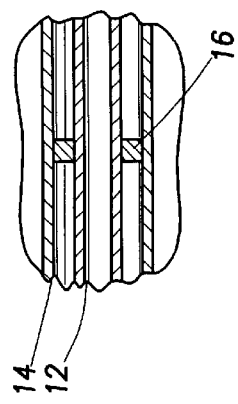
FIG. 1(b) is a detailed view of one end of a heated segment of pipeline.

Referring to FIG. 1, the concept of one embodiment of "electrical readiness" is illustrated for the pipe-in-pipe configuration of electrical heating. In FIG. 1(a), pipeline 10 is shown on the sea floor. Pipeline 10 may be divided into Segments 10a, 10b, and so on. The segments may be heated simultaneously or sequentially in any order. The pipe-in-pipe configuration is described more fully in the patent application entitled "Electrical Heating of Pipelines with Pipe-In-Pipe and Mid-Line Connector," filed concurrently and commonly assigned, which has been incorporated by reference herein. FIG. 1(b) shows the detail of each end of a segment having a pipe-in-pipe configuration, such as Segment 10a. The pipeline has inner pipe 12, which is the flowline, and outer concentric pipe 14. These pipes are electrically isolated except at bulkheads, such as bulkhead 16, which exist at the end of each segment to be heated (unless replaced by an insulating joint, as discussed below). A bulkhead is an electrical conductor between the inside and the outside pipe. It is normally a welded-in ring that separates the annulus between the inner and outer pipes into compartments.

Referring again to FIG. 1(a), between the bulkheads in each segment is mid-line connector 20. Mid-line connector 20 will be described in more detail below. Its function is to allow electrical contact to the inside and outside pipes and electrically isolate the pipes. Connector 20 is attached to cable 21, which has wet-mateable connector 22 attached at the opposite end. (Wet-mateable connectors are available, for example from Tronic Ltd., Cumbria, England.) The cable and connector may be supported by buoyancy module 24. Alternatively, cable 21 and module 24 may be omitted, leaving the possibility of electrical connections directly to wet-mateable connector 22, which is attached to mid-line connector 20.

The concept of electrical readiness is that the equipment to provide for electrical heating of a segment or segments of the pipeline be installed when the pipeline is installed such that electrical heating may be applied at sometime later in the life of the pipeline. In one embodiment, electrical readiness provides that the power for electrical heating be supplied by shipboard equipment. FIG. 1(a) illustrates heating of segment 10b by equipment mounted on a ship, shown generally at 40. FIG. 1(c) illustrates in more detail ship-mounted equipment. Umbilical reel 42 is used to store and control release of an umbilical to the sea floor. Preferably, step-up transformer 44 provides that power be transported subsea at a higher voltage than applied to the pipeline, to minimize current requirements of the umbilical. Phase balance and power factor correction network 46 optimizes use of the electrical power. Switch gear 48 provides ability to control the power from electrical power generator 49. Other power supply configurations may be used that do not require a transformer or matching network, which is well know to one of skill in the art.

When the need for pipeline remediation occurs due to a flowline restriction or blockage, intervention vessel 40 moves into the proper location, deploys transformer 30 (FIG. 1(a)) into the water and lowers it to the seabed in close proximity to the mid-line connector of the segment to be heated, such as segment 10b. Marine umbilical 32 suspends subsea transformer 30 and also provides for the transmission of high voltage power from intervention vessel 40 to subsea transformer 30. Once transformer 30 is lowered to the seabed, ROV 26 then retrieves the free end of cable 21 and connects it to the output receptacle of transformer 30, using wet-mateable connector 22. On the deck of intervention vessel 40, power generation equipment 49 then supplies three-phase electrical power to heat the pipeline segment. The output of the generator connects through electrical switch gear 48 to phase balance and power factor correction network 46. Switch gear 48 may provide the overriding control of the power delivery system and protection against electrical faults. It may also be linked to other equipment for safety interlocks and emergency protection.

Since pipeline segment 10b is strictly a single-phase mode and has a relatively poor electrical power factor, phase balance and power factor correction network 46 may be included to provide a means to balance and correct the power drawn from three-phase generator 49. The output of this network is connected to the primary step-up transformer 44. Due to the high current levels required for the pipeline segment, it is more feasible to transmit the power subsea through a marine umbilical at a higher voltage. This provides more efficient transmission through the marine umbilical and provides for a more easily achieved design of a marine umbilical. Output of subsea step-down transformer 30 is designed to be at the voltage and current levels as prescribed in the design basis for heating the pipeline. This power is transmitted through mid-line power cable 21 and connector 20 to pipeline segment 10b to heat the segment.

Inner pipe 12 (FIG. 1(b)) conducts the heating current away from mid-line connector 20 in both directions and outer pipe 14 is the return conductor for this current back into mid-line connector 20. The inner and outer pipes are short-circuited at bulkheads 16 at each end of segment 10b to complete the circuit. Since mid-line connector 20 is normally located halfway between bulkheads 16, the heating current is roughly divided evenly between the two halves of the heated segment.

Each segment such as segment 10a and 10b may be equipped with mid-line connector such as 20. The distance between bulkheads 16 may vary along pipeline 10 or may be approximately the same. The distance between bulkheads will ordinarily be from about one mile to about 10 miles, but may be smaller or greater. The mid-line connector may be installed as the pipeline is assembled on a J-lay vessel. Mating subsea power jumper cable 21 may be connected to each mid-line connector and deployed during the deployment process. There are two possible approaches to accomplish this: (1) The cable may be mounted to mid-line connector 20 onboard the J-lay vessel and temporarily attached to the pipeline above the connection point. As pipeline 10 is deployed and once power cable 21 is sufficiently submerged, divers may remove the temporary attachments and attach buoyancy through the free end of cable 21. Or, (2) the pipeline may be deployed from the vessel with mid-line connector 20 installed but without cable 21. Once mid-line connector 20 is sufficiently submerged, cable 21 may be lowered from the vessel and divers may mate it with the mid-line connector using wet-mateable connector 22. In this case, buoyancy may be pre-attached to the free end of the cable, such as by buoyancy module 24. In either case, some cable connector components would be subject to impact, vibration and structural loads while being deployed through the J-lay equipment.

Buoyancy module 24 attached to cable 21 will keep the free end above the pipeline as it lands on the sea floor and allow easy access to that end by an ROV. When a need for flowline remediation occurs, submersible transformer 30 may be deployed to the sea floor in close proximity to mid-line connector 20. ROV 26 would then mate the free end of cable 21 to a receptacle on transformer 30, using wet-mateable connector 22.

Power cable 21 and connector assembly 22 are intended to be ROV-retrievable and ROV-installable. After installation of pipeline 10, then ROV 26 would be able to de-mate a failed power cable from the mid-line connector and install a replacement.

Placement of mid-line connectors on the sea floor may require consideration of pipe rotation during placement. Steps may also be taken to minimize this problem using the methods described in co-pending arid commonly assigned patent application entitled "Apparatus and Method for Connecting Cables to Subsea Flowlines" filed Aug. 1, 2000, which is hereby incorporated by reference herein.

Figure 2:
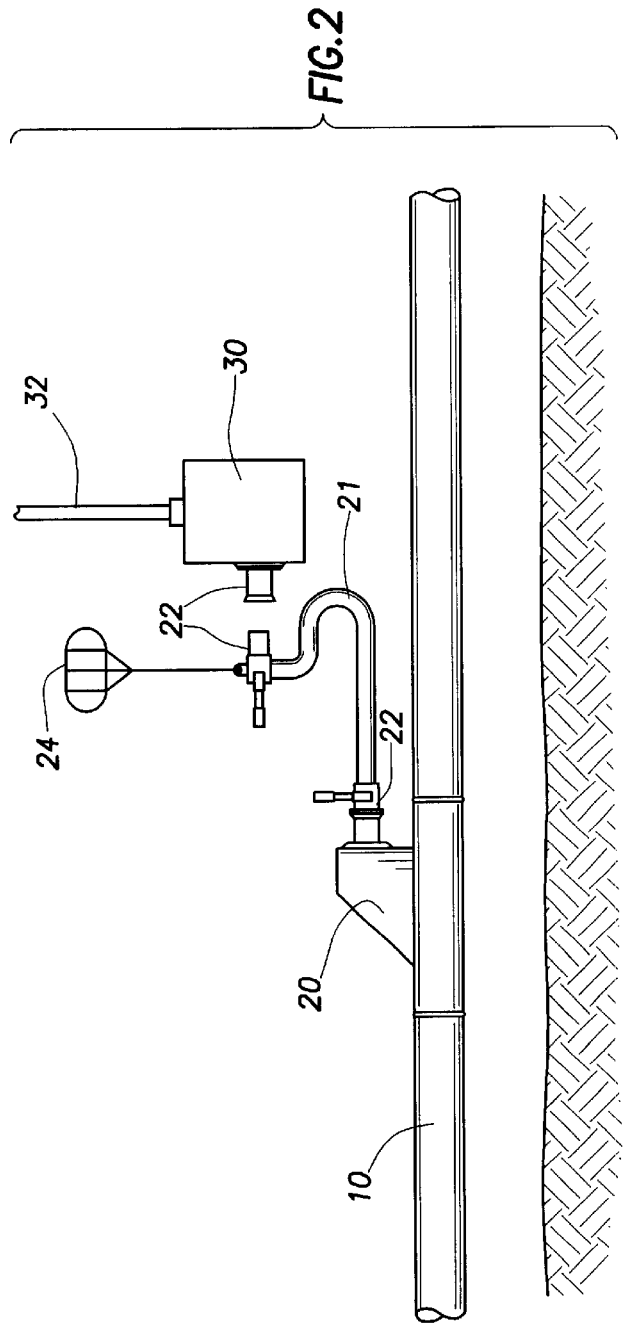
FIG. 2 is a cross-section view of a mid-line connector with a wet-mateable connector and a pre-installed jumper cable.

In another embodiment, buoyancy may not be provided for power cable 21 when it is attached to mid-line connector 20, but power cable 21 may be pre-attached, as shown in FIG. 2. In this embodiment, when electrical power is to be supplied to a segment of pipeline 10, power cable 21 may be raised by buoyancy module 24 to allow easier access by an ROV (not shown) for mating of wet-mateable connector 22 with subsea transformer 30. Subsea transformer 30 is supported by umbilical 32.

Figure 3:
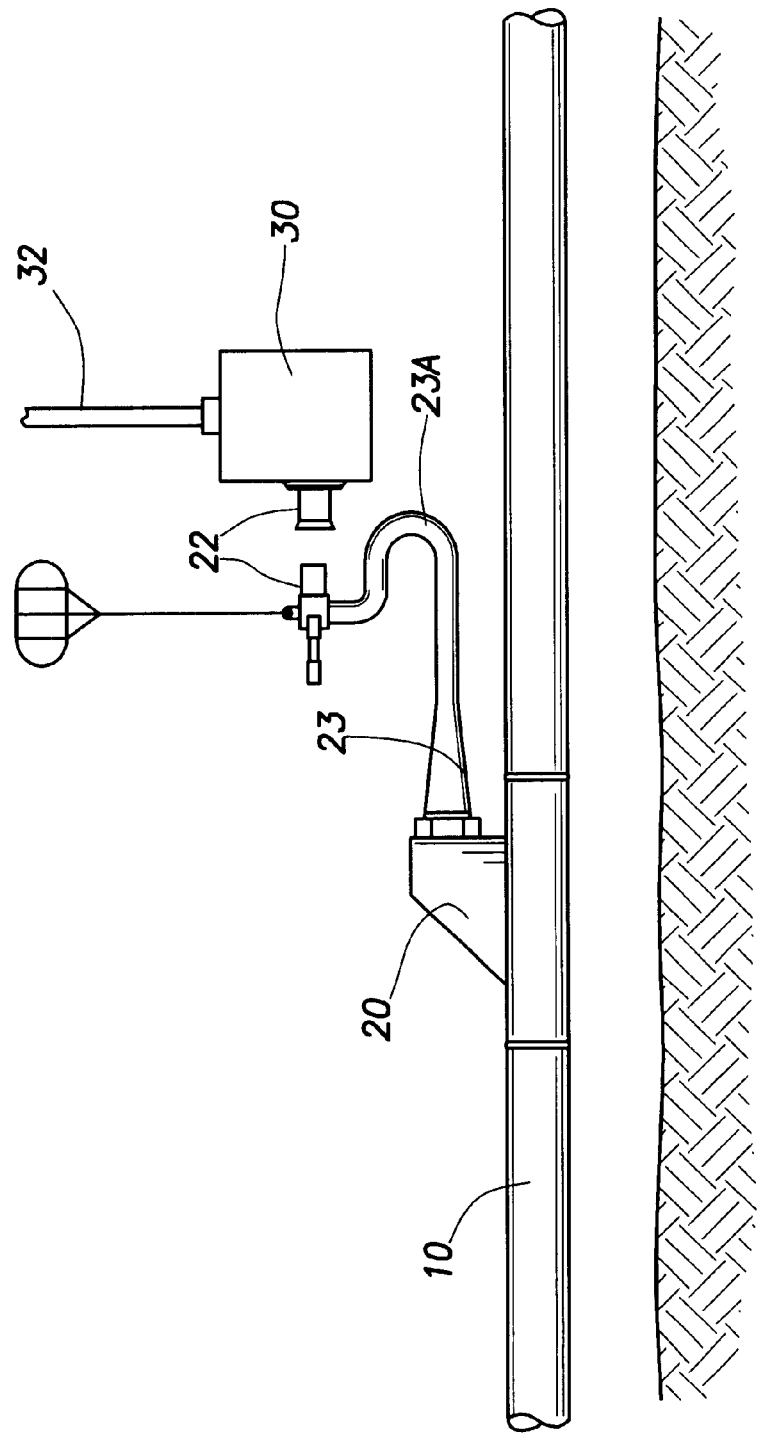
FIG. 3 is a cross-section view of a mid-line connector with a dry penetration connector and a pre-installed jumper cable.
Figure 6D:
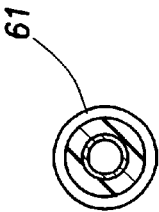
FIGS. 6(c) and 6(d) are cross-section and end views of a pre-deployment contactor for the SHIP configuration.
Figure 6B:
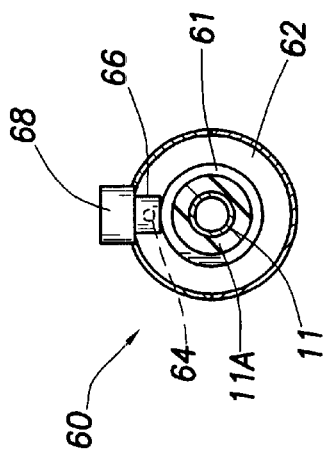
FIGS. 6(a) and 6(b) are cross-section and end views of a midline connector for a Single Heated Insulated Pipe (SHIP) configuration.
Figure 6C:
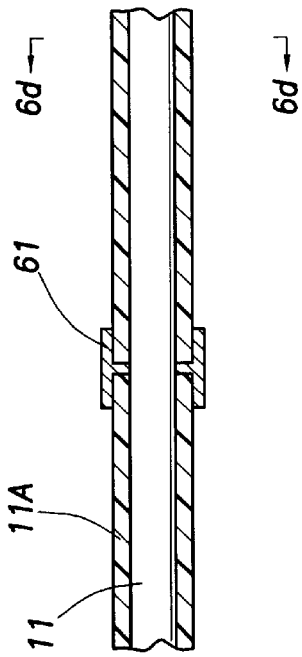
Figure 6A:
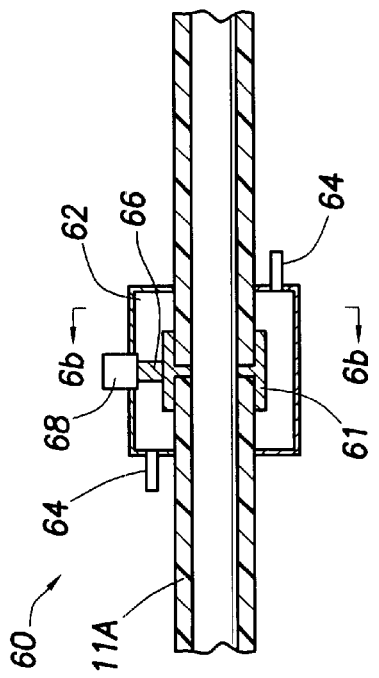

In another embodiment, shown in FIG. 3, fixed penetrator 23 is installed before the pipeline is deployed and replaces a wet-mateable connector attached to midline connector 20. Power cable 23A is connected to penetrator 23 and may then be attached to subsea transformer 30 by wet-mateable connector 22. Transformer 30 is supported by umbilical 32. The mid-line penetrator, cable assembly and wet-mate connection, if damaged, could lead to complete failure of the system due to the irreplaceable nature of the penetrator. Repair would require return of the mid-line connector to the surface. This embodiment requires that the penetrator/cable assembly be in place during the fabrication process, thereby increasing risk of damage. However, the embodiment offers the possibility of reducing costs.

In yet another embodiment, shown in FIG. 4, connection to mid-line connector 20 is accomplished through wet-mateable connector 22 and connector 25 to transformer 30 is dry-mateable. This connection is therefore made before transformer 30 is deployed. This reduces the expenses and risks of subsea operations. When the cable assembly is deployed with transformer 30, there is also a reduced short-term risk during deployment and fabrication and also less long-term risk due to fouling, anchor damage, environmental and other factors. This method may employ an external pipe lifting H-frame 70. A support vessel would be required to support H-frame 70 before it is deployed. External rotating mudmat 72 may be deployed during the pipe laying operation. This would elevate the single mid-line connector receptacle to a position which would allow ROV access regardless of pipe rotation. Mudmat 72 may be installed by divers after pipeline 10 has passed through the rollers during installation.

Mid-line connectors on or near the sea floor must be accessible for mating with wet-mateable connectors. Multiple mid-line connectors may be placed on a pipeline such that one connector will more likely be accessible for application of an ROV to make connection with a power cable. Mid-line connectors may be placed 180° apart on the pipeline, for example. In the worst case configuration from a rotation perspective then, both mid-line receptacles would be located parallel to the seabed, at or below the mudline. This could require jetting out a section of the pipeline in order to gain adequate access to the receptacle. This design has the advantage of providing redundancy from a connector standpoint.

A cross-sectional view of a wet-mateable mid-line connector for a pipe-in-pipe configuration is shown generally at 20 in FIG. 5(a). Inside pipe 52 is adapted to connect to inside pipe 12 of pipeline 10 (FIG. 1). Outside pipe 54 is likewise adapted to connect to outside pipe 14 of a pipeline. Housing 55 contains electrical conductors 57 and 58, which contact the outside and inside pipes, respectively. Wet-mateable connector 56 is attached to housing 55. Referring to FIG. 5(b), which is an end view, connector 56 contains contacts 59, which are connected to conductors 57 and 58.

Electrical readiness may also be applied to Single Heated Insulated Pipe (SHIP) systems. Such systems are described in co-pending and commonly assigned application Ser. No. 08/921,737, filed Aug. 11, 1999, which is hereby incorporated by reference herein, and co-pending and commonly assigned application titled "Apparatus and Method for Heating Single Insulated Flowlines," filed Aug. 1, 2000, which is hereby incorporated by reference herein. Electrical readiness may include, but is not limited to, wet-mateable connectors to make up the umbilical subsea, mid-line electrical connectors or insulating joints, seawater electrodes or insulating joints to complete the circuit, along with electrical insulation to isolate the pipe from the seawater if the fully insulated system is used. If the "earthed current" system is used, as described in the publication "Introduction to Direct Heating of Subsea Pipelines," overview by Statoil, Saga, et al, February 1998, provisions for connecting to seawater electrodes, for example, may be provided as a part of electrical readiness.

A mid-line connector that may be used in the SHIP configuration is illustrated in FIG. 6. Such a connector is shown generally at 60 in FIGS. 6(a) and 6(b)(end view). To prepare for later installation of the mid-line connector, through-insulation contactor 61 may be installed before pipe 11 with insulation 11A is deployed, as indicated in FIGS. 6(c) and 6(d) (end view). At a later time, compartment 62 may be placed around contactor 61 and clamped in place. Alternatively, compartment 62 may be placed around contactor 61 before deployment of the pipeline. Any seawater inside compartment 62 may be the flushed from the compartment through ports 64. Only low pressure exists across seals between the walls of compartment 62 and layer of insulation 11A. An expansion chamber may be connected to compartment 62 to provide for thermal expansion and contraction of fluid in compartment 62. During placement of compartment 62, electrical contact between conductor 66 and through-insulation contactor 61 may be established. If compartment 62 is placed after deployment of the pipeline, contactor 61 may be cleaned of corrosion or other films before deployment of compartment 62, to insure a good electrical contact between conductor 66 and contactor 61. If compartment 62 is placed before deployment of the pipeline, contactor 61 may be connected to wet-mateable connector 68. If compartment 62 is placed after deployment, conductor 66 may be attached to wet-mateable connector 68. Therefore, power may be supplied through mid-line connectors to pipe 11 of a segment to be heated using the apparatus and methods described above.

Since the power for electrical readiness may be rarely needed, it is a significant advantage that one work boat, such as shown in FIG. 1, may support a large number of flowlines, spreading the cost of the umbilical, the generator and other ancillary equipment over many flowlines instead of requiring installation of this equipment for each flowline.

FIG. 7 illustrates application of electrical readiness to heating a segment of a Single Heated Insulated Pipe with electrical current flow from the first end of the segment to the second end. Pipe 11 is covered with insulation 11A between electrical connectors 74 and 76. Connectors 22A are attached to pipeline connector 74 and 76. Connectors 22A may be either dry-mateable or wet-mateable. If dry-mateable, they must be installed before pipeline 11 is deployed subsea. Power cable 21 connects to wet-mateable connectors 22. Buoyancy module 24 may be used to support power cable 21. Seawater electrode 77 is shown attached to one of the wet-mateable connectors 22. In one mode of operation of the SHIP, return current from the pipeline is carried by seawater through seawater electrodes. Seawater electrode 77 may be installed along with power cable 77A and a mating part of wet-mateable connector 22. A second wet-mateable connector 22 is attached to electrical connector 76. For electrical heating of pipeline 11 in the segment between electrical connector 74 and 76, electrical power may be applied through wet-mateable connector 22 that is attached to connector 76. This power may be supplied by shipboard equipment as shown in FIG. 1(c). Boat 40 may be moved into place to supply power to connector 76 when heating of the segment between 74 and 76 is desired. Return current through seawater electrode 77 may be collected through a second seawater electrode that may be in the vicinity of boat 40 or at a suitable location. The apparatus and method of electrical readiness illustrated in FIG. 7 may be applied to any single pipe configuration employing electrical current entering or leaving a segment to be heated between two electrical connectors. For example, they may be applied to the earthed-current system referenced above.

Figure 8:
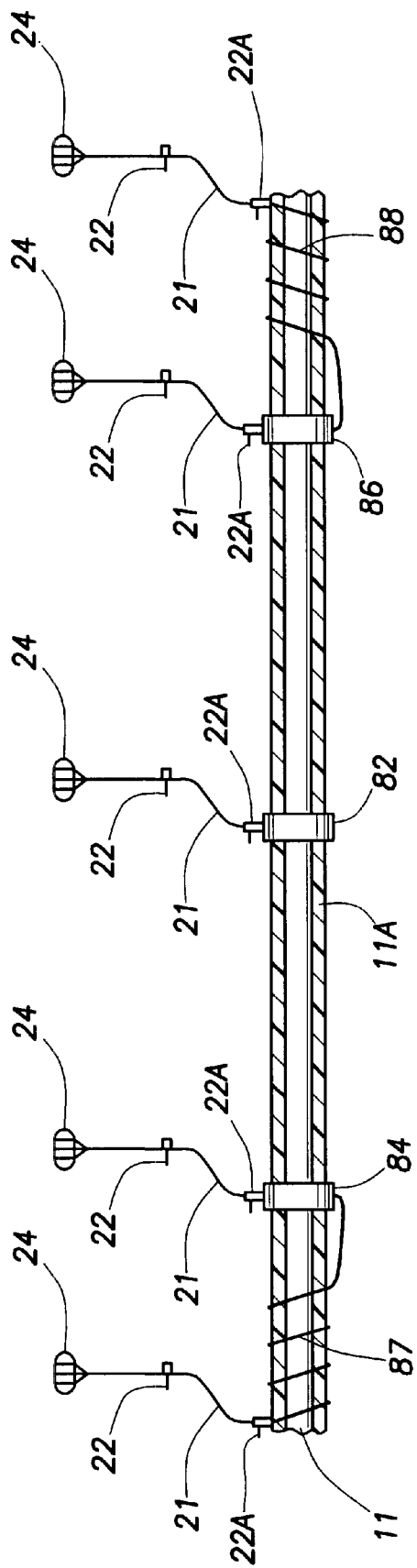
FIG. 8 is a cross-section view of a Single Heated Insulated Pipe with a mid-line connector deployed with heaters outside the heated segment and buoyed wet-mateable connectors.

FIG. 8 illustrates an alternate heating method in which there is provided a center feed into a SHIP. In this configuration, as more fully explained in co-pending and commonly assigned patent application entitled "Apparatus and Method for Heating Single Insulated Flowlines," filed Aug. 1, 2000, which is incorporated by reference herein, electrical power may be fed to center connector 82 and return current may be conducted from connectors 84 and 86 at each end of a segment of pipe 11 that is to be heated.

Alternatively, electrical current may be withdrawn from electrical connectors 84 and 86 at the end of the primary segment to be heated and passed through electrical heaters 87 and 88 that are outside the primary segment to be heated. These heaters may be used to heat buffer zones or jumpers, as more fully explained in the referenced application. Connectors 22A may be either dry-mateable or wet-mateable. If dry-mateable they must be attached before the connector is deployed subsea. If wet-mateable, one portion of the connector will be attached on land and the mating portion, attached to cable 21, will be joined after deployment of pipeline 11. Power cable 21 extends to a second wet-mateable connector 22. All connectors 22 may be supported by buoyancy module 24. If power cables 21 are attached to pipeline 11 before it is placed subsea, buoyancy module 24 may be used or may be omitted. Wet-mateable connectors 22 are intended to be operated by ROV. The power umbilical and transformer such as shown at 32 and 30 in FIG. 1 may be connected to electrical connector 82 in the center of the segment to be heated. Return cables or seawater electrodes may be connected either at electrical connectors 84 and 86 or at the end of either heater 87 or 88 or at the end of both heaters 87 and 88, such that electrical current passes through the heaters. Alternatively, power cables 21, wet-mateable connectors 22 and buoyancy module 24 may be omitted and power from ship 40 and return cables to ship 40 may be connected directly into connectors 22A, in which instance connectors 22A will be wet-mateable connectors. In another alternative, power cables may be attached between connectors on each end of heater 87 or heater 88, illustrating how the apparatus and method of electrical readiness may be applied to any type of electrical heater.

Figure 9B:
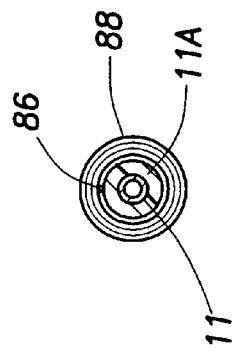

An alternative apparatus and method for introducing electrical power to a segment of pipeline to be heated is illustrated in FIG. 9. Using this apparatus and method a mid-line connector, such as shown at 82 in FIG. 8, is eliminated, while the benefits of the midline concept are retained. A toroidal transformer, shown generally at 90 in FIG. 9(a), is used. Transformer 90 may be permanently installed, with a buoyed pigtail such as shown connected to connector 82 in FIG. 8. Pipe 11 and surrounding seawater form the secondary circuit of a transformer formed by looping cable 86 around core 88. Alternatively, seawater electrodes 77 may be eliminated and a cable may be attached from one end of the pipe to the other to complete the secondary. The ends of cable 86 may terminate in a wet-mateable connector such as connector 56, shown in FIG. 5. Core 88, preferably steel, is laminated in the radial direction to prevent excessive eddy current losses. Laminations must be thin to allow for the skin effect. The preferred thickness depends on choice of core material and frequency, but in some cases would be in the range of conventional lamination thicknesses for power applications, which are in the range of 9–14 mils. Alternatively a ferrite core may be used, which will allow higher frequency operation and may be clampable, but would generally need to be larger than steel for the same power rating. This may reduce the needed size of the apparatus subsea transformer, or eliminate it altogether, as well as reduce the current that must be carried by an umbilical, such as umbilical 32 of FIG. 1. Given the proper current, thermal insulation value and temperature target, the cross-sectional area and therefore the volume of the transformer needed is proportional to the voltage required in the pipe, and therefore the length of pipe to be heated. Cable 86 may be installed with multiple loops around core 88. This allows generation of the desired current in pipe 11 by using a higher voltage and lower current to excite the primary winding. The lower current could reduce the size and cost of the cable used to connect power to the pipe. FIG. 9(b) shows a cross-section (b—b) through transformer 90. Only one loop of cable 86 is illustrated here, although multiple loops may be used. Multiple transformers with parallel excitation may be used to increase the length of pipeline to be heated, rather than making bigger transformers. The pipe may be equipped with electrical insulation and seawater electrodes such as seawater electrode 77, which may be connected by cable 77A.

The use of a midline transformer as illustrated in FIG. 9 requires no penetration of insulation layer 11A on the pipeline, which may reduce cost of pipe construction and risk of failure as compared with a mid-line connector. Also, primary excitation current through an umbilical can be lower current and higher voltage, which may reduce umbilical costs. It is only necessary to introduce seawater electrodes, which may be pre-installed, at each end of a segment of the pipeline to be heated. The toroidal transformer size depends on frequency, amount of insulation and desired temperature of the pipeline segment. As an example of size, for a SHIP the transformer may be 1 inch thick and 30 inches long for every 500 feet of pipe length to be heated. This size becomes large for a pipe several miles long.

As another example, assume a thickness of 1 inch for a toroidal transformer. The magnetic permeability of steel used in laminations is chosen to run the core at about the saturation flux. Otherwise the desired current may not be developed if the core is being used to apply power to the pipe. A permeability of approximately 1500 times the permeability of free space is compatible with a current of about 270 amperes in a pipe of 6.625 inches diameter. Assume a core length of 0.5 meter, one turn of cable and 4 volts applied to the cable (or wire). This would produce about 270 amperes in the pipe. The current to the cable would be 270/number of turns. The voltage is proportional to the core length and number of turns. The length of the core required is as follows: if the length of pipe to be heated has impedance z, the voltage V required on the pipe is (z)×(current). The length of core required to power this length of pipe is then (0.5 meter)×(V/4).

The voltage developed is proportional to core cross-sectional area, so the core length may be shortened in approximately the same proportion as core thickness is increased, as long as the core is not saturated. A somewhat longer core than 0.5 meter may be used because the magnetic field falls off in proportion to distance from the center of the pipe.

A toroidal transformer may also be used to extract power for small electrical loads such as heating of pipeline jumpers, operating equipment or other purposes. This may be combined with an electrically ready mid-line connector on the main pipeline segment to speed up the heating process by not requiring a separate heating operation for a pipeline jumper. The same configuration as shown in FIGS. 9(a) and 9(b) may be used to extract power. The toroidal transformer may be placed on the pipeline when the pipeline is deployed and placed at a selected location in the segment to be heated.

The apparatus and methods of electrical readiness have been particularly described herein with respect to configurations for heating using pipe-in-pipe and Single Heated Insulated Pipe. It should be understood that the methods of installing wet-mateable connectors subsea and later connecting cables, saltwater electrodes or other types of apparatus for supplying electrical power to a segment of a pipeline, either from a portable power source such as may be mounted on a boat, or from a fixed power source that may be available on a structure such as a platform, as described herein, may be applied to any type of electrical heating method. For example, the method may be applied to "Combipipe," heat tracing or other forms of electrical heating known in the art.

While particular preferred embodiments of the present invention have been described, it is not intended that these details should be regarded as limitations on the present invention, except to the extent that they are included in the following claims.

What we claim is:

1. Apparatus for electrically heating a segment of a subsea pipeline, the segment having a first end and a second end, comprising:
    an inner pipe and an outer concentric pipe forming an annulus in the segment to be heated;
    electrical connections between the inner and the outer concentric pipe at the first and second ends of the segment;
    a midline connector having electrical connections to the inner and to the outer concentric pipe, the midline connector being disposed at a selected location intermediate the first and second ends; and
    a wet-mateable electrical connector electrically connected to the midline connector.

2. The apparatus of claim 1 wherein the wet-mateable connector is directly connected to the midline connector.

3. The apparatus of claim 1 wherein the wet-mateable connector is connected to the midline connector through a cable that is electrically connected to the midline connector.

4. The apparatus of claim 3 further comprising a buoyancy module for supporting the wet-mateable connector.

5. The apparatus of claim 1 further comprising a frame for supporting the midline connector.

6. The apparatus of claim 1 wherein the electrical connections between the inner and the outer concentric pipe at the first and second ends are bulkheads.

7. The apparatus of claim 1 further comprising a toroidal transformer in the annulus the transformer being disposed at a selected location in the segment and having a wet-mateable connector electrically connected to a cable of the toroidal transformer.

8. Apparatus for electrically heating a segment of a subsea pipeline, the segment having a first end and a second end, comprising:
    a flowline pipe covered with a layer of electrical insulation so as to insulate the pipe from surrounding seawater in the segment;
    electrical connectors to the pipe at the first and the second end of the segment; and
    a wet-mateable connector connected to at least one of the electrical connectors to the pipe.

9. The apparatus of claim 8 wherein the wet-mateable connector is directly connected to the electrical connectors to the pipe.

10. The apparatus of claim 8 wherein the wet-mateable connector is connected to the electrical connectors to the pipe through a cable that is electrically connected to the electrical connectors.

11. The apparatus of claim 10 further comprising a buoyancy module for supporting the wet-mateable connector.

12. The apparatus of claim 8 further comprising a midline connector, the midline connector being disposed at a selected location intermediate the first and second ends and having a wet-mateable connector attached thereto.

13. The apparatus of claim 12 wherein the wet-mateable connector is directly connected to the midline connector.

14. The apparatus of claim 12 wherein the wet-mateable connector is connected to the midline connector through a cable that is electrically connected to the midline connector.

15. The apparatus of claim 14 further comprising a buoyancy module for supporting the wet-mateable connector.

16. The apparatus of claim 12 wherein the midline connector comprises a compartment surrounding a through-insulation connector and having a wet-mateable connector electrically connected thereto.

17. The apparatus of claim 12 further comprising a toroidal transformer around the pipe, the transformer being disposed at a selected location in the segment and having a wet-mateable connector electrically connected to a cable of the toroidal transformer.

18. Apparatus for electrically heating a segment of a subsea pipeline, the segment having a first end and a second end, comprising:
    a flowline pipe covered with a layer of electrical insulation so as to insulate the pipe from surrounding seawater in the segment;
    electrical connectors to the pipe at the first and the second end of the segment;
    a wet-mateable connector connected to at least one of the electrical connectors to the pipe; and
    a toroidal transformer disposed at a selected location intermediate the first end and the second end and having an electrical cable, the cable being attached to the wet-mateable connector.

19. The apparatus of claim 18 wherein the toroidal transformer includes a laminated metal core.

20. The apparatus of claim 18 further comprising a second toroidal transformer around the pipe, the transformer being disposed at a selected location in the segment and having a wet-mateable connector electrically connected to a cable of the second toroidal transformer.

21. A method for electrically heating a selected segment of a subsea pipeline, the segment having electrical conductors for supplying electrical power for heating the segment, comprising:
    electrically connecting a wet-mateable connector to at least one electrical conductor used for supplying power to the segment before the pipeline is deployed;
    deploying the pipeline and after the pipeline is deployed forming an electrical circuit including the step of connecting the wet-mateable connector;
    providing a source of power; and
    connecting the source of power to the circuit and applying electrical power to heat the selected segment of the pipeline.

22. The method of claim 21 wherein the source of power is ship-mounted.

23. The method of claim 21 wherein the source of power is fixed.

24. The method of claim 21 wherein the power source is connected to the circuit employing a Remotely Operated Vehicle.

25. The method of claim 21 wherein at least one of the conductors is pipe.

26. The method of claim 21 wherein at least one of the conductors is cable.

27. A method for electrically heating a selected segment of a subsea pipeline, the segment having a first end and a second end, an inner pipe and an outer concentric pipe forming an annulus in the segment, electrical connections between the inner and the outer concentric pipe at the first and second ends of the segment, and a midline connector having electrical connections to the inner pipe and to the outer concentric pipe, the midline connector being disposed at a selected location intermediate the first and second ends, and a wet-mateable electrical connector electrically connected to the midline connector, comprising:

providing a source of electrical power at a selected voltage;

lowering the source of power to the vicinity of the wet-mateable electrical connector;

connecting the source of power to the wet-mateable connector and applying electrical power to heat the selected segment of the pipeline.

28. The method of claim 27 wherein the step of connecting the source of power to the wet-mateable connector employs a Remotely Operated Vehicle.

29. The method of claim 27 wherein the step of providing a source of electrical power includes the steps of stepping up and stepping down a voltage to obtain the selected voltage.

30. The method of claim 27 wherein the step of providing a source of electrical power includes the step of improving the power factor.

31. A method for electrically heating a selected segment of a subsea pipeline, the segment having a first end and a second end and a flowline pipe being covered with a layer of electrical insulation so as to insulate the pipe from surrounding seawater, electrical connectors to the pipe at the first end and the second end of the segment and wet-mateable connectors connected to the electrical connectors to the pipe, comprising:

providing a source of electrical power at a selected voltage;

lowering the source of electrical power to the vicinity of at least one of the wet-mateable connectors; and connecting the source of power to the wet-mateable connectors and applying electrical power to heat the selected segment of the pipeline.

32. The method of claim 31 wherein the step of connecting the source of power to the wet-mateable connectors employs a Remotely Operated Vehicle.

33. The method of claim 31 wherein the step of providing a source of electrical power includes the steps of stepping up and stepping down voltage to obtain the selected voltage.

34. The method of claim 31 wherein the step of providing a source of electrical power includes the step of improving the power factor.

35. The method of claim 31 further comprising the steps of providing a through-insulation connector in the segment at a location intermediate the first end and second end, adding a compartment around the through-insulation connector, the compartment having an accessible wet-mateable connector attached thereto and an inside contactor disposed to make electrical contact between the accessible wet-mateable connector and the through-insulation connector when the compartment is added;

flushing the compartment so as to provide an electrically insulating fluid in the compartment;

providing a source of electrical power;

lowering the source of electrical power to the vicinity of the accessible wet-mateable connector; and connecting the source of power to the wet-mateable connectors and applying electrical power so as to heat the selected segment of the pipeline.

36. The method of claim 35 wherein the step of connecting the source of power to the wet-mateable connectors employs a Remotely Operated Vehicle.

37. The method of claim 35 wherein the step of providing a source of electrical power includes the steps of stepping up and stepping down a voltage to obtain the selected voltage.

38. The method of claim 35 wherein the step of providing a source of electrical power includes the step of improving the power factor.

39. A method for electrically heating a selected segment of a subsea pipeline, the segment having a first end and a second end and a flowline pipe being covered with a layer of electrical insulation so as to insulate the pipe from surrounding seawater, electrical connectors to the pipe at the first end and the second end of the segment and a toroidal transformer around the flowline pipe at a selected location intermediate the first end and the second end of the segment, the toroidal transformer having a wet-mateable connector, comprising:

providing a source of electrical power;

electrically inter-connecting the electrical connectors to the pipe at the first end and the second end;

lowering the source of electrical power to the vicinity of the toroidal transformer; and connecting the source of power to the wet-mateable connector of the toroidal transformer and applying electrical power to heat the selected segment of the pipeline.

40. The method of claim 39 wherein the step of electrically inter-connecting the electrical connectors to the pipe at the first end and the second end is provided by connecting wet-mateable connectors to the connectors and placing electrical cable between the wet-mateable connectors.

41. The method of claim 39 wherein the step of electrically inter-connecting the wet-electrical connectors to the pipe at the first end and the second end is provided by attaching seawater electrodes to the electrical connectors.

42. The method of claim 41 wherein wet-mateable connectors are attached to the electrical connectors to the pipe and the seawater electrodes are attached to wet-mateable connectors.

43. The method of claim 41 wherein the seawater electrodes are attached to the electrical connectors to the pipe before the pipe is deployed.

* * * * *